United States Patent [19]

Kobayashi et al.

[11] Patent Number: 5,392,266
[45] Date of Patent: * Feb. 21, 1995

[54] AUTOMATIC DISC EXCHANGE APPARATUS

[75] Inventors: Takashi Kobayashi, Kanagawa; Tsurayuki Sugiyama, Tokyo, both of Japan

[73] Assignees: NKK Corporation; Kabushiki Kaisha Nikkyo Seisakusho, Japan

[*] Notice: The portion of the term of this patent subsequent to Jul. 16, 2008 has been disclaimed.

[21] Appl. No.: 920,462
[22] PCT Filed: Dec. 25, 1990
[86] PCT No.: PCT/JP90/01689
§ 371 Date: Aug. 19, 1992
§ 102(e) Date: Aug. 19, 1992

Related U.S. Application Data

[63] Continuation-in-part of Ser. No. 269,475, Nov. 9, 1988, Pat. No. 5,033,038.

[51] Int. Cl.6 .................................................. G11B 17/22
[52] U.S. Cl. ............................................. 369/36; 369/34; 369/38; 360/98.04
[58] Field of Search ................. 369/34, 36, 38, 178, 369/192; 360/98.06, 98.04, 92, 96.5

[56] References Cited

U.S. PATENT DOCUMENTS

| | | | |
|---|---|---|---|
| 4,561,078 | 12/1985 | Nakayama | 369/38 |
| 4,757,401 | 7/1988 | Teranishi | 369/34 |
| 4,817,071 | 3/1989 | Carlson et al. | 369/36 |
| 4,853,916 | 8/1989 | Tomito | 369/36 |
| 4,954,918 | 9/1990 | Shiosaki | 360/98.06 |
| 5,033,038 | 7/1991 | Kobayashi et al. | 369/36 |
| 5,036,503 | 7/1991 | Tomita | 369/36 |
| 5,150,341 | 9/1992 | Shibayama | 369/36 |

FOREIGN PATENT DOCUMENTS

| | | | |
|---|---|---|---|
| 59-186168 | 10/1984 | Japan | . |
| 60-15854 | 1/1985 | Japan | . |
| 60-50660 | 3/1985 | Japan | . |
| 60-79555 | 5/1985 | Japan | 360/98.06 |
| 60-177465 | 9/1985 | Japan | . |
| 60-201566 | 10/1985 | Japan | . |
| 60-224144 | 11/1985 | Japan | 369/36 |
| 60-253058 | 12/1985 | Japan | . |
| 60-261066 | 12/1985 | Japan | . |
| 63-269373 | 11/1988 | Japan | . |

Primary Examiner—Stuart S. Levy
Assistant Examiner—Jefferson Evans
Attorney, Agent, or Firm—Thomas H. Whaley

[57] ABSTRACT

An automatic disk exchange apparatus including a drum-type disk gripper arranged vertically movably and capable of horizontally holding a disk cartridge containing for example an optical disk and selectively introducing and removing the disk cartridge through either of access openings at both sides thereof, a pair of disk storage devices each arrranged at one of the sides of the disk gripper and horizontally storing a plurality of disk cartridges, and a pair of drive units arranged in a lower part of one of the disk storage devices for effecting the recording and reproduction of information whereby the disk cartridges are transported and exchanged between the disk storage devices and the drive units and between the disk storage devices and the outside with the disk cartridges being always held horizontally.

3 Claims, 12 Drawing Sheets

AUTOMATIC DISC EXCHANGE APPARATUS

This application, which is equivalent to PCT/JP90/01689, is a continuation-in-part of U.S. patent application Ser. No. 07/269,475, filed Nov. 9, 1988, now U.S. Pat. No. 5,033,038.

(TECHNICAL FIELD)

The present invention relates to an automatic disk exchange apparatus for transferring and exchanging disk cartridges each containing for example an optical disk between the outside and disk storage devices as well as between the disk storage devices and drive units, and more particulary the invention relates to an automatic disk exchange apparatus which contributes toward reducing the disk cartridge exchange time and increasing the efficiency of the exchange operation.

(BACKGROUND ART)

As peripheral equipment for optical information reproducing apparatus, the automatic disk exchange apparatus of the type disclosed for example in Laid-Open Patent No. 60-243865 have been in use.

Figure 14:
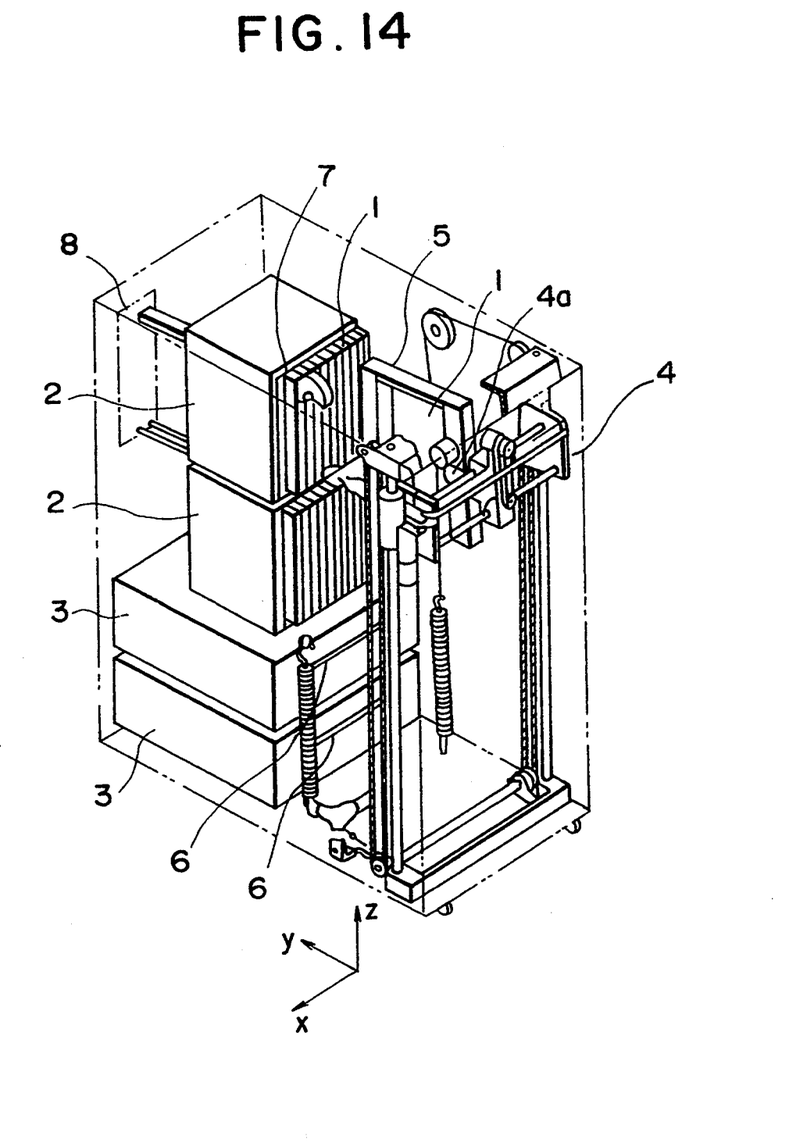
FIG. 14 is a perspective view showing a conventional apparatus.

FIG. 14 is a perspective view showing the conventional automatic disk exchange apparatus. In the Figure, numeral 1 designates disk cartridges each containing an optical disk, 2 disk storage devices each in the form of a bookcase having a plurality of slots for vertically storing the disk cartridges 1, 3 drive units for recording and reproducing information from the optical disks, 4 a transport device arranged in opposition to the disk discharge openings of the storage devices 2, and 5 a transport frame supported in a canthevered manner on a rotating part 4a of the transport device 4, the transport frame 5 incorporating transfer means for transferring the disk cartridge 1.

With the automatic disk exchange apparatus constructed as described above, in order to transport selected one of the disk cartridges 1 stored in the storage device 2 to the drive unit 3 for information recording-/reproducing purposes, the transport device 4 is driven into operation so that the transport frame 5 is moved in an X direction or the traverse and a Z direction or the vertical direction, thereby stopping it at the position where the selected disk cartridge 1 is stored. In this condition, the given disk cartridge 1 is moved in a Y direction by the transfer means of the transport frame 5 to transfer it from the storage device 2 to the transport frame 5.

Then, after the transport frame 5 has been rotated through 90 degrees by the rotating means 4a of the transport device 4 thereby bringing it into a horizontal position, the transport frame 5 is moved downward, transported to the position of the drive unit 3 and stopped thereat by means of the transport device 4. Thereafter, the disk cartridge 1 in the transport frame 5 is inserted through an inlet/outlet port 6 of the drive unit 3 and mounted in position within the drive unit 3. When the disk cartridge 1 is mounted in the drive unit 3, its optical disk is subjected to the recording/reproduction of information by the drive unit 3.

When the recording/reproduction by the drive unit 3 is completed, the disk cartridge 1 is delivered to the transport frame 5 from the drive unit 3. The transport frame 5 is transported in the reverse manner to the previously mentioned operation and the disk cartridge 1 is restored in the initial position in the storage device 2.

Also, when selected one of the disk cartridges 1 stored in the storage device 2 is to be removed to the outside for changing, the disk cartridge 1 to be changed is temporarily stored in a vacant slot 7 provided in the storage device 2 by the transport unit 4. This disk cartridge 1 is removed to the outside through a cartridge inlet/outlet port 8. When a disk cartridge 1 is to be stored in the storage device 2 from the outside, the disk cartridge 1 is inserted through the cartridge inlet/outlet port 8 so that the disk cartridge 1 stored in the vacant slot 7 is removed, transported to a given position in the storage device 2 and stored thereat by the transport device 4.

In this way, it is possible to store a plurality of disk cartridges 1 in the storage device 2 and automatically transport the stored disk cartridge 1 between the storage devices 2 and the drive units 3, thereby effecting the recording and reproduction of information efficiently.

In accordance with the above-mentioned conventional automatic disk exchange apparatus, however, in view of the fact that the disk cartridges 1 are vertically stored in the storage device 2 and the drive unit 3 is arranged horizontally, the transportation of the disk cartridge 1 between the storage device 2 and the drive unit 3 requires that the transport frame 5 is caused to make not only a three-dimensional motion in the X, Y and Z directions but also a rotary motion for changing the position of the disk cartridge 1. Therefore, there are drawbacks that the transport device 4 is complicated ill construction and that troubles tend to occur easily.

Also, since the transport frame 5 is required to make the three-dimensional motion and the rotary motion, as for example, the three-dimensional motion for moving the transport frame 5 requires 3 to 4 seconds and the rotary motion requires about 1 second, thus requiring about 4 to 5 seconds as the total access time. If the disk cartridges 1 are stored at a place remoter from the drive until 3, this access time is additionally increased correspondingly. Thus, there is the additional disadvantage that the time interval between the removal of the disk cartridge 1 from the storage device 2 and the loading of it in the drive unit 3 is increased.

There is another disadvantage that since the transport frame 5 is supported in a canthevered manner on the transport device 4, not only the transport frame 5 must be balanced by balancing means such as springs but also a motor producing a large torque is required for rotating the transport frame 5 against the force of the balancing means, thereby further complicating the construction and increasing the failure and the production cost.

Further, since the storage devices 2 are arranged along the transport path of the transport frame 5 which is supported in a canthevered manner on the transport device 4, the storage devices 2 can be arranged only on one side of the transport frame 5 and therefore there are disadvantages that the accommodation efficiency of the disk cartridges 1 is deteriorated and that the apparatus is inevitably increased in size in cases where a large number of disk cartridges 1 are accommodated.

Further, where the disk cartridges 1 are to be changed between the outside and the storage devices 2, the exchange is effected by removing and introducing the disk cartridges 1 through the cartridge inlet/outlet port 8 always one at a time and thus there is the disadvantage that much time is required for storing and returning a plurality of the disk cartridges 1.

(DISCLOSURE OF INVENTION)

The present invention has been made with a view to overcoming the foregoing deficiencies in the prior art, and it is an object of the Invention to provide an automatic disk exchange apparatus capable of enhancing the disk cartridge accommodation efficiency and affecting the exchange of disk cartridges in a short period of time and easily. The disk storage exchange apparatus of this invention is an improvement over that disclosed in our U.S. Pat. No. 5,033,038, incorporated herein by reference.

The automatic disk exchange apparatus according to time present invention is characterized by comprising:

- a disk gripper including a holder for horizontally holding a disk cartridge, a pair of rotational drums each attached to one end of the holder and provided with a gear in an outer peripheral surface thereof and a disk access opening in central portion thereof, and disk exchange means of introducing OF removing a disk cartridge in a horizontal position from the holder through the disk access opening,
- a disk transport device including lifting means for vertically moving the disk gripper to stop it at a given position, and rotating means engaged with the gear in the outer peripheral surface of the rotational drum of the disk gripper to rotate the disk gripper about the center of the disk access opening constituting an axis of rotation,
- a pair of disk storage devices each arranged on one side of the transport path of the disk gripper so as to horizontally store a plurality of disk cartridges, and
- drive units arranged at least in the lower part of one of the disk storage devices for recording and reproducing information from the disks.

Also, in accordance with a preferred embodiment of the present invention the disk exchange means of the disk gripper comprises:

- two driving roller pairs including a pair of inner gripper rollers disposed to the ends of one longitudinal side of the holder so as to grip the disk cartridge within the holder and a pair of outer gripper roller each arranged contiguously to one of the inner gripper rollers so as to grip a disk cartridge within the disk storage device,
- two follower roller pairs including a pair of inner rollers and a pair of outer gripper rollers which are disposed at the ends of the other longitudinal side of the holder and are respectively positioned in opposition to the driving roller pairs,
- gripper roller rotational driving means for rotating the gripper rollers,
- driving roller pair changeover means including a pair of driving cams which are respectively engaged with the driving roller pairs at the ends of the holder and connected therewith with a phase shift of 180 degrees, and rotational driving means for rotating the driving cams, and
- follower roller pair changeover means including a pair of cams each mounted on the rotary shaft of one of the driving cams with a phase shift of 180 degrees therebetween, and a pair of links each connected between one of the pair of cams and the associated follower roller pair.

Further, the driving roller pair changeover means should preferably be constructed to include:

- a pair of main arms arranged along the one longitudinal side of time holder in such a manner that their base ends serve as a common rotary shaft,
- a pair of auxiliary arms each connected to the forward end of one of the main
- the driving roller pairs respectively mounted at the ends of the auxiliary arms,
- the driving cams respectively engaged with the driving roller pairs with a phase shift of 180 degrees therebetween, and
- the rotational driving means for rotating the driving cams.

In accordance with the present invention, a plurality of the disk cartridges are horizontally stored in each of the disk storage devices provided on the sides of time disk Gripper so that selected one of the disk cartridges is transported, while being held horizontally, to the drive unit, thereby reducing the disk cartridge transport distance and simplifying the construction of the disk transport device.

By rotating the disk gripper about the center of the disk access opening serving as a horizontal axis of rotation through the rotating means of the disk transport device, it is possible to transport the disk cartridge within the disk gripper in an upside-down manner to the drive unit.

In addition, by alternately opening and closing the driving roller pairs and the follower roller pairs, which are adapted for disk cartridge gripping and moving purposes, at the respective side ends of the disk gripper by the driving roller pair changeover means and the follower roller pair changeover means, it is possible to selectively introduce or remove a disk cartridge from either of the disk access openings of the disk gripper.

Also, the driving roller pair changeover means can be arranged on each longitudinal side of the holder so that by rotating each pair of main arms having the common rotary shaft, the driving roller pairs on the auxiliary arms connected to the forward ends of the main arms can be alternately opened and closed at the respective side ends of the disk gripper, thereby selectively introducing or removing the disk cartridge from either of the disk access openings of the disk gripper in the like manner as mentioned previously.

As described hereinabove, in accordance with the present invention the disk cartridges are exchanged between the disk storage devices and the drive units while always holding the disk cartridge horizontally, with the result that the disk storage devices can be arranged on the sides of the transport path of the disk gripper so that not only a large number of disk cartridges can be stored but also the transport distance of the stored disk cartridges can be decreased, thereby greatly reducing the total access time required for the changing of the disk cartridges.

Further, since the disk transport device can transport a disk cartridge in response to a one-dimensional linear motion by the lifting means, the disk transport device can be simplified and the rate of occurrence of troubles can be reduced.

Since the disk gripper is rotated about the center of the disk access opening or the axis of rotation by the rotating means of the disk transport device in such a manner that the disk cartridge is turned upside down and transported to the drive unit, either one of the sides of the optical disk contained within the disk cartridge can be selected as desired.

Further, since the driving roller pairs and the follower roller pairs which are provided in the disk gripper to grip and move a disk cartridge are alternately opened and closed by the driving roller pair changeover means and the follower roller pair changeover means at the respective end portions of the disk gripper, the disk cartridge can be selectively introduced or removed with ease for neither side of the disk gripper.

(BEST MODE FOR CARRYING OUT THE INVENTION)

Figure 1:
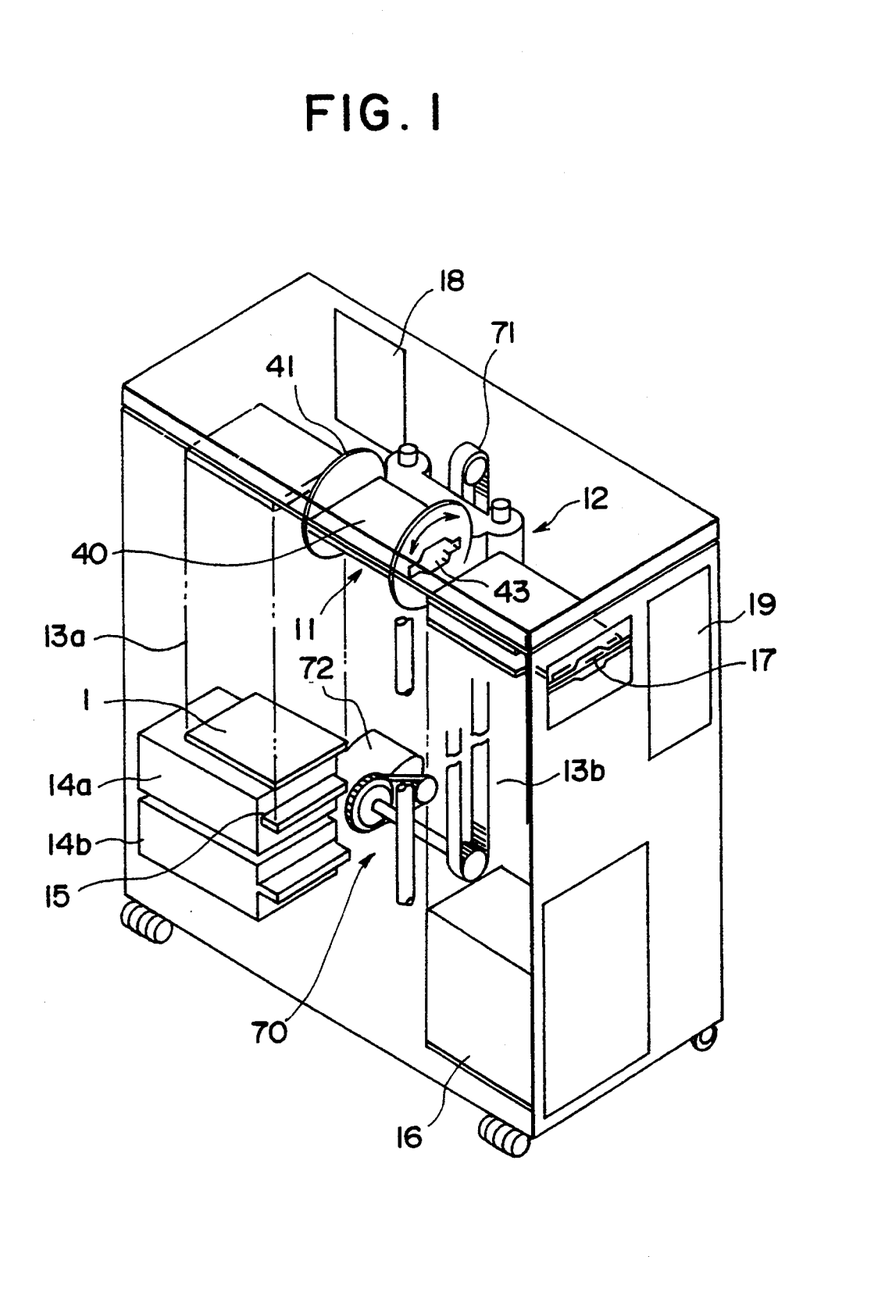
FIG. 1 is a perspective view showing an embodiment of the present invention.

FIG. 1 is a perspective view showing an embodiment of the present invention and, as shown in the Figure, the automatic disk exchange apparatus includes a disk gripper 11 for gripping a disk cartridge containing an optical disk in a horizontal position, a disk transport device 12 for vertically transporting the disk gripper 11, disk storage devices 13a and 13b arranged on the sides of the disk transport path of the disk gripper 11 and horizontally storing disk cartridges 1, drive units 14a and 14b arranged in the lower part of the disk storage device 13a and each having a disk inlet/outlet port 15 on the disk transport path side, a moving storage unit 16 arranged in the lower part of the other disk storage device 13b, a disk exchange window 17 for introducing or removing the disk cartridges 1 one at a time, a controller 18 and a display control unit 19.

Figure 2:
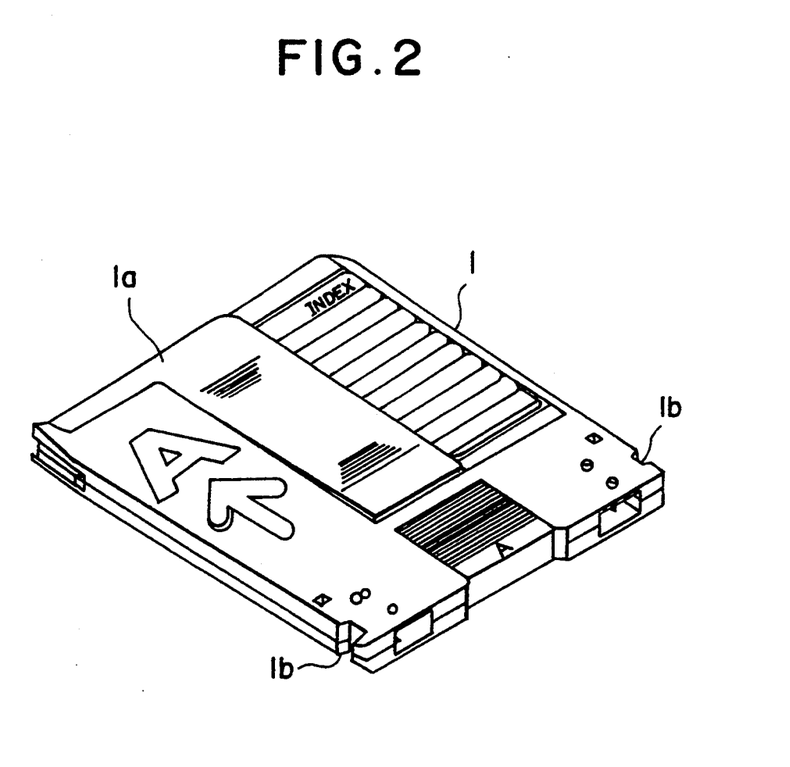
FIG. 2 is a perspective view showing the disk cartridge.

As shown by the perspective view of FIG. 2, the disk cartridge 1 is provided with a slidable shutter on its case surface and notches 1b on the case sides.

Figure 3:
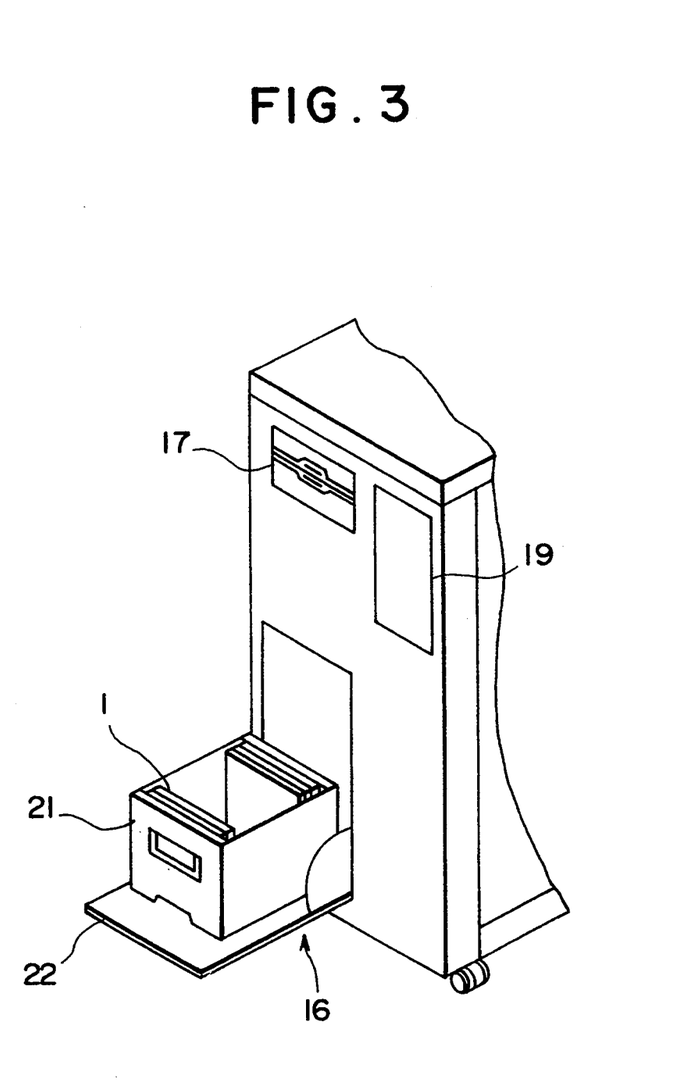
FIG. 3 is a perspective view showing the moving storage unit.

As shown by the perspective view of FIG. 3, the moving storage unit 16 includes a storage pack 21 for storing a given number, e.g., 16 disk cartridges 1 orderly, and a loading door 22 attached to the front panel of the apparatus, having mounted thereon the surface of the opposite side to the disk cartridge outlet port Of the storage pack 21 and pivotable about its lower Supporting portion so as to be opened and closed. Then, as shown by the schematic view of FIG. 4, the moving storage unit 16 includes locking means 23 for inhibiting the opening of the loading door 22 during the transfer, recording and reproduction of the disk cartridges 1, a door opening/closing detecting switch 24 operable in response to the opening and closing of the loading door 22, and a pack detecting switch 25 for detecting the presence of the storage pack 21 when the loading door 22 is closed.

Figure 5:
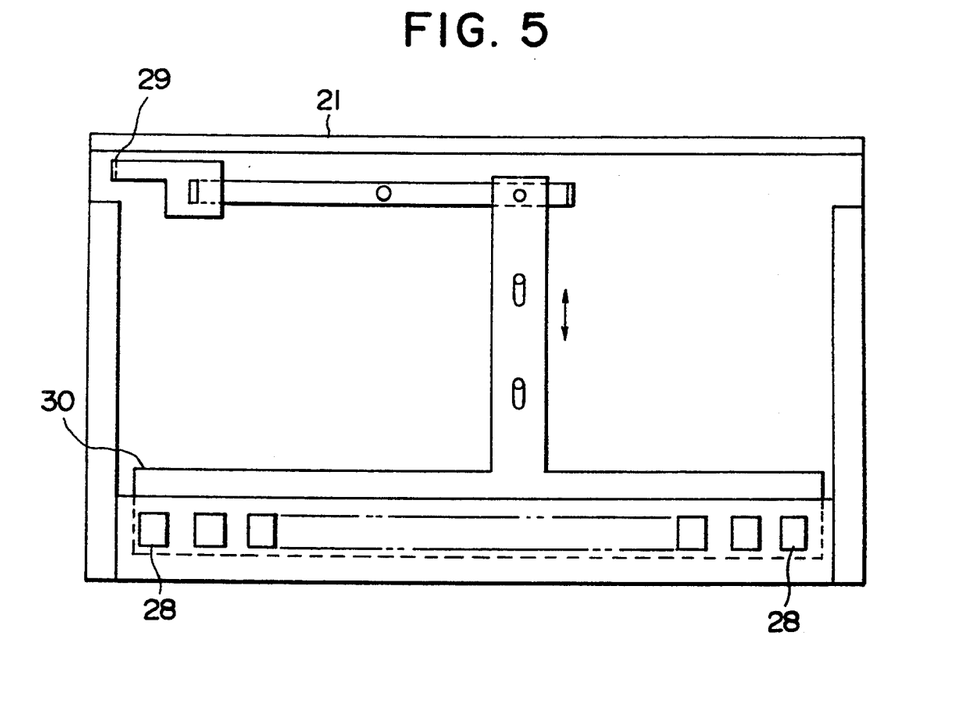
FIG. 5 is a side view showing the storage pack with its side cover taken away.
Figure 6:
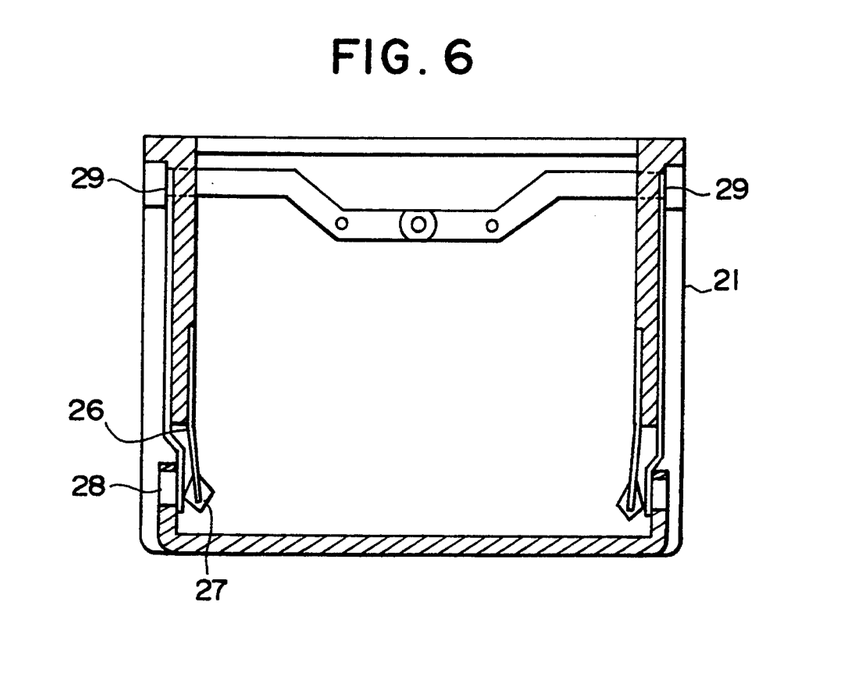
FIG. 6 is a sectional view of the storage pack.

As shown by the side view of FIG. 5 in which the side cover is removed and the sectional view of FIG. 6, the storage pack 21 includes cartridge locking means composed of a plurality of stoppers 27 which are each fastened to a plate spring 26 for engagement with the notch 1b of each disk cartridge 1, a plurality of windows 28 for the escapement of the stoppers 27, a pair of control claws 29 provided at the forward ends of the front face ends of the storage pack 21, and a pair of shielding plates 30 for opening and closing the window 28 in response to the vertical rotation of the control claws 29. When the loading door 22 is closed, the control, claws 29 are pressed against locking release claws 31 which are provided on the apparatus proper, thereby moving the shielding plates 30.

Figure 7:
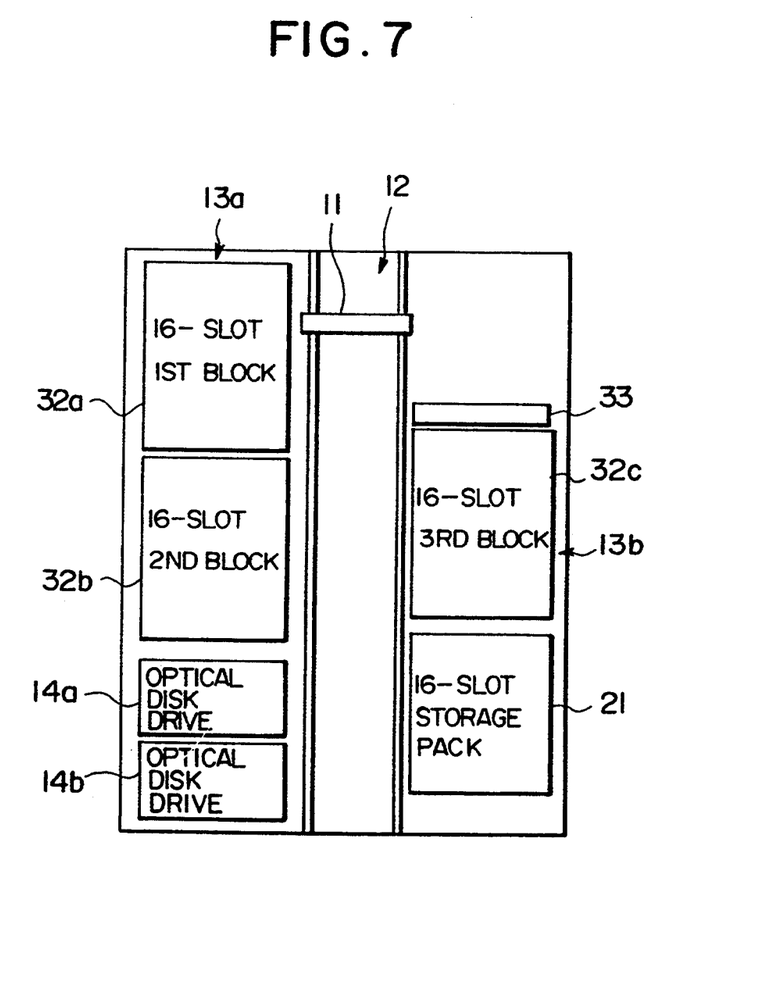
FIG. 7 is a view showing the arrangement of the disk storage devices and the storage pack.

As shown in FIG. 7, the storage pack 21 is divided into a plurality of slots required for Storing a given number of e.g., 16 disk cartridges 1. Also, the disk storage devices 13a and 13b are respectively provided with fixed storage blocks 32a, 32b and 32c, each divided into the same number off slots as the storage pack 21 and a temporary stand-by block 33.

Figure 8:
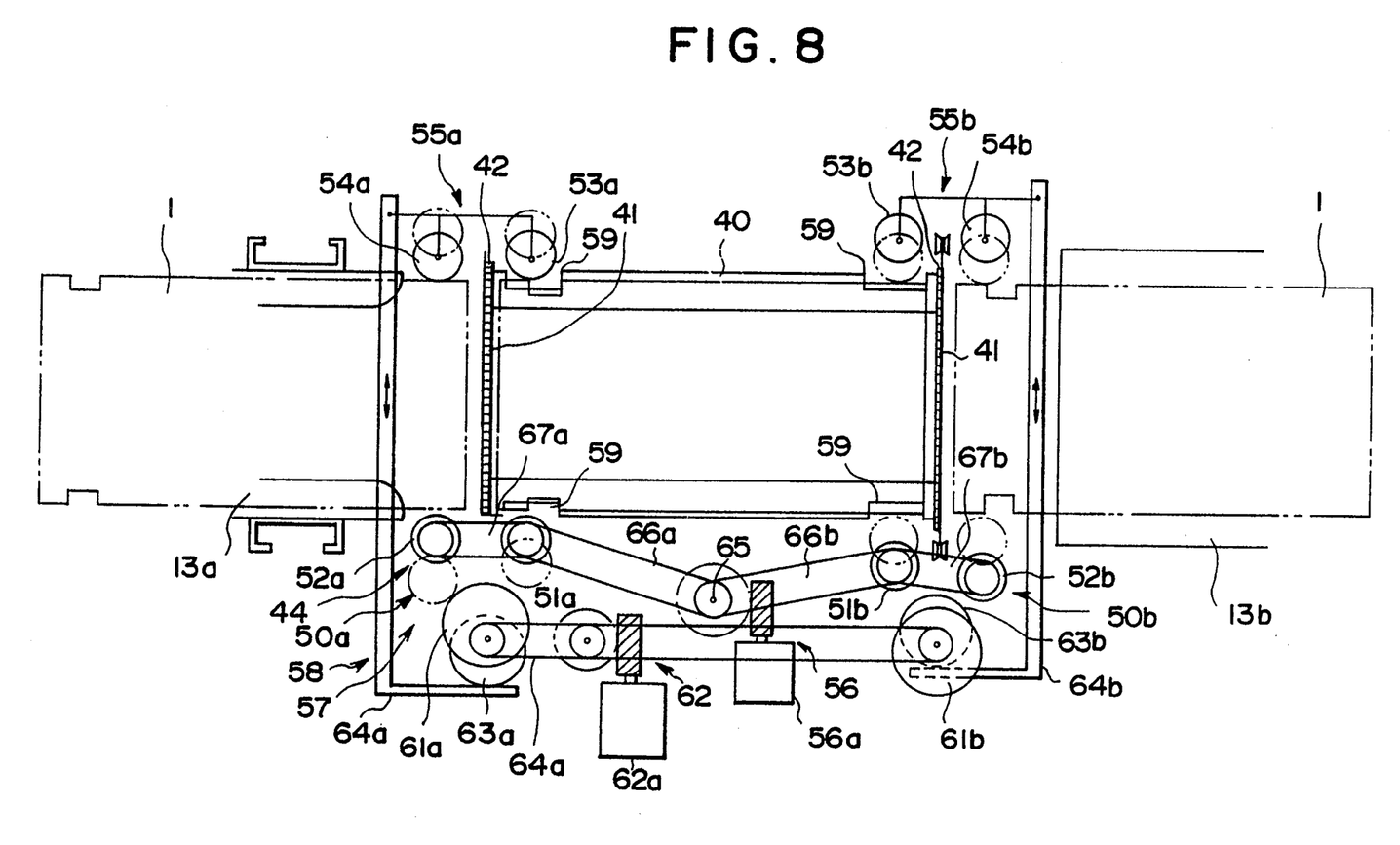
FIG. 8 is a plan view of the disk gripper.
Figure 9:
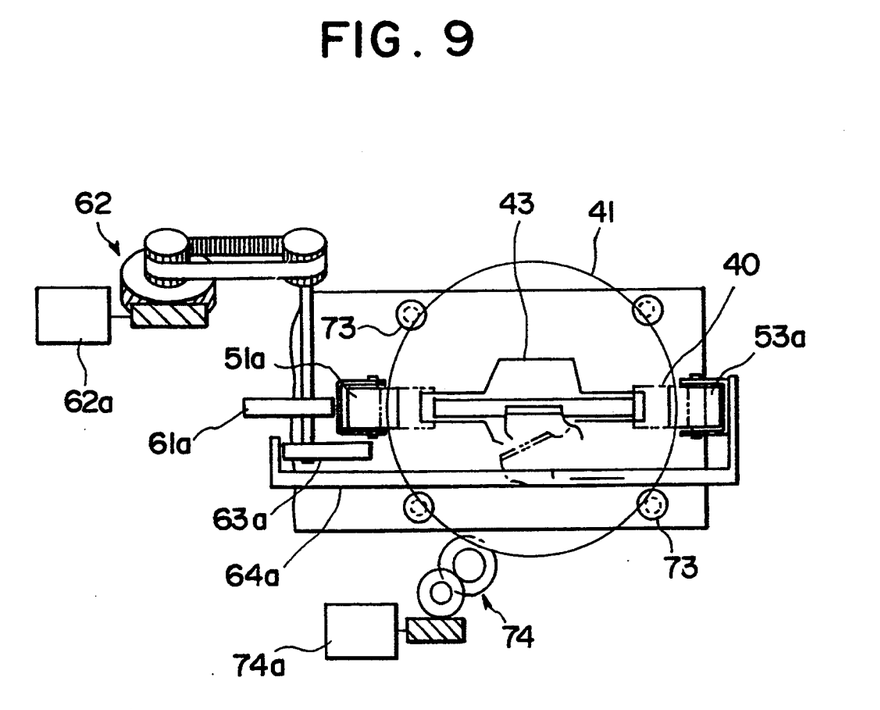
FIG. 9 is a side view of the disk gripper.

As shown by the plan view of FIG. 8 and the side view of FIG. 9, the disk gripper 11 includes a holder 40 for horizontally holding a disk cartridge 1, a pair of rotational drums 41 each attached to one of the ends of the holder 40 and provided with a gear 42 in its outer peripheral surface and a disk access opening 43 in its central portion, and disk exchange means 44 whereby the disk cartridge 1 in the horizontal position is introduced or removed from the holder 40 through either of the disk access openings 43. As shown by the perspective view of FIG. 10, the disk gripper 11 is mounted within a lifting box 45 of lifting means which will be described later and the side plates of the lifting box 45 are each formed with a disk access opening 46 of the same shape as the disk access openings 43 of the rotational drums 41. Also, as shown by the sectional view of FIG. 11, the holder 40 is composed of a pair of rails 40a and 40b consisting of two parallel channel members bridged between the rotational drums 41. Numeral 47 designates a pair of connecting members extended between the rotational drums 41.

The disk exchange means 44 includes driving roller pairs 50a and 50b respectively composed of inner gripper rollers 51a and 51b which are respectively provided at the ends of one longitudinal side of the holder 40 and adapted to grip the disk cartridge 1 within the holder 40 and outer gripper rollers 52a and 52b respectively arranged contiguously to the inkier gripple rollers 51a and 51b so as to grip the disk cartridges 1 within the disk storage devices 13a and 13b, respectively, follower roller pairs 55a and 55b composed of inner gripper rollers 53a and 53b and outer gripping rollers 54a and 54b which are respectively arranged at the ends of the other longitudinal side of the holder 40 in opposition to the driving roller pairs 50a and 50b, gripper roller rotating means 56 for rotating the gripper rollers connected by a driving belt, driving roller pair changeover means 57 and follower roller pair changeover means 58. Also, the inner gripper rollers 51a, 51b, 53a and 53b are adapted to grip the disk cartridge 1 within the holder 40 through notches 59 formed at the end portions of the holder 40.

The driving roller pair changeover means 57 includes a pair of driving cams 61a and 61b which are respectively engaged with the driving roller pairs 50a and 50b and which are connected to each other with a phase shift of 180 degrees, and rotational driving means 62 for rotating the driving cams 61a and 61b. Also, the driving roller pair changeover means 57 is provided with a pair of main arms 66a and 66b arranged along one longitudinal side of the holder 40 and having their base ends adapted to serve as a common rotary shaft 65, and a pair of auxiliary arms 67a and 67b respectively connected to the forward ends of the main arms 67a and 67b. Also, the driving roller pairs 50a and 50b respectively engaged with the driving cams 61a and 61b with a phase shift of 180 degrees therebetween are respectively attached to the ends of the auxiliary arms 67a and 67b, respectively.

The follower roller pair changeover means 58 includes a pair of cams 63a and 63b respectively attached to the rotary shafts of the driving cams and 61b with a phase shift of 180 degrees therebetween, and a pair of links 64a and 64b respectively connected between the cams 63a and 63b and the follower roller pairs 55a and 55b.

Figure 10:
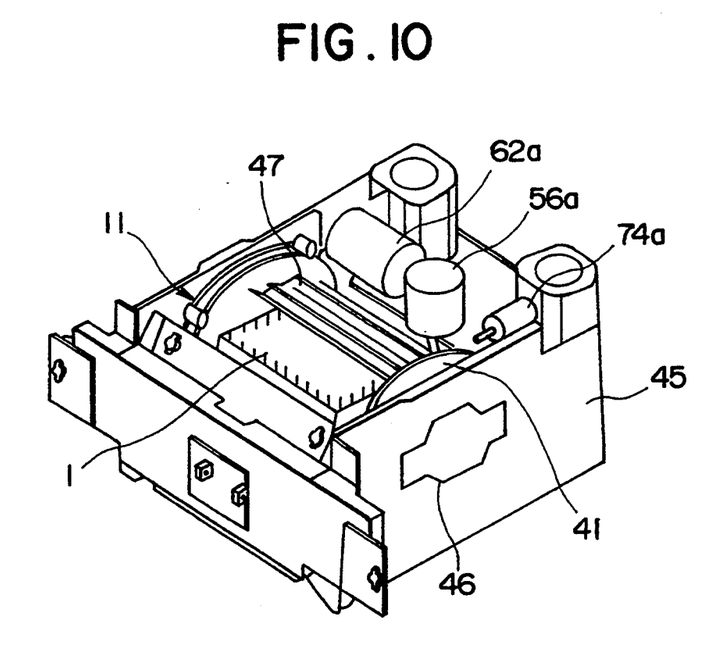
FIG. 10 is a perspective view of the disk gripper.
Figure 11:
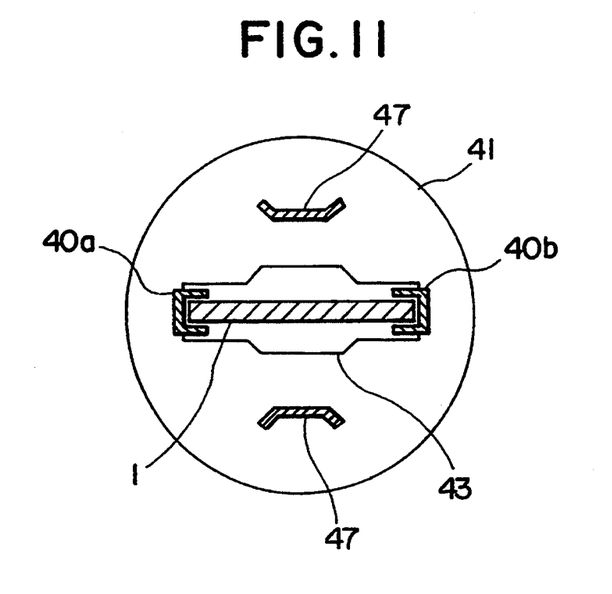
FIG. 11 is a sectional view of the holder of the disk gripper.

The disk transport device 12 includes lifting means 70 composed of a lifting mechanism 71 and driving means 72 whereby the disk gripper 11 is supported in the lifting box 45, moved vertically and stopped at a given position, a plurality of guide rollers 73 in engagement with the rotational drum 41 of the disk gripper 11, and driving means 74 engaged with the gear 42 in the outer peripheral surface of the rotational drum 41 to drive the disk gripper 11 into rotation about the center of the disk access opening 43 constituting the axis of rotation.

Figure 12:
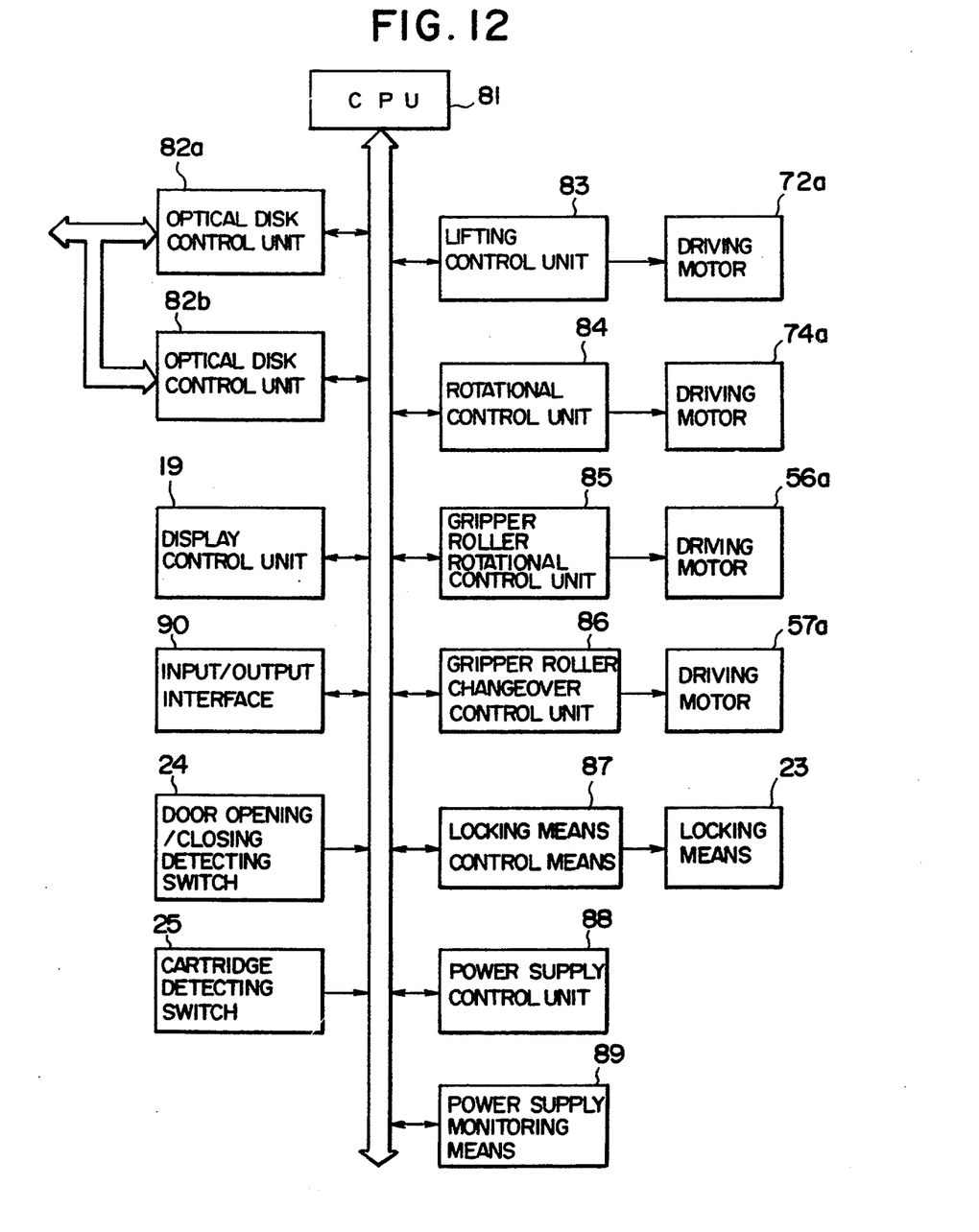
FIG. 12 is a block diagram showing the controller.

FIG. 12 is a block diagram showing time controller 18 of the automatic disk exchange apparatus constructed as described above. As shown in the Figure, the controller 18 includes a CPU 81 for controlling the apparatus on the whole, optical disk control units 82a and 82b for respectively controlling the operation of the drive units 14a and 14b, a lifting control unit 83 for controlling a drive motor 72a of the lifting means 70, a rotation control unit 84 for controlling a drive motor 74a of the driving means 74, a gripper roller rotational control unit 85 for controlling a drive motor 56a of gripper roller rotating means 56, a gripper roller changeover control unit 86 for controlling a drive motor 57a of the driving roller pair changeover means 57, a locking means control unit 87 for controlling the operation of the locking means 23, a power supply control unit 88 and power supply monitoring means 89, and a door opening/closing detecting switch 24, a cartridge detecting switch 25 and a display control unit 19 are connected to the controller 18.

The operation of the automatic disk exchange apparatus constructed as described above will be described with reference to cases where the disk cartridges 1 are exchanged between the disk storage devices 13a and 13b and the drive units 14a and 14b and where the disk cartridges 1 stored in the disk storage devices 13a and 13b are exchanged between them and the outside, respectively.

(1) In the case of exchanging the disk cartridges between the disk storage devices and the drive units:

When one of the disk cartridges 1 stored in the disk storage devices 13a and 13b is selected, the CPU 81 first brings the lifting control unit 83 into operation so that the lifting means 70 is driven and the disk gripper 11 is moved vertically, thereby stopping the disk griper 11 at the position where the selected disk cartridge 1 is stored.

Then, the CPU 81 brings the gripper roller changeover control unit 86 into operation so that the drive motor 57a of the driving roller pair changeover means 57 is rotated and the driving cams 61a and 61b are rotated, thereby closing driving roller pair 50a and the follower roller pair 55a which are on the side where the selected disk cartridge 1 is stored and opening the other driving roller pair 50b and follower roller pair 55b. When the driving roller pair 50a and the follower roller pair 55a are closed, the end of the disk cartridge 1 stored in the disk storage device 13a is gripped by the outer gripping rollers 52a and 54a. In this condition, the driving motor 56a of the gripping roller rotating means 56 is rotated by the gripping roller rotation controller 85 so that the disk cartridge 1 is moved onto the holder 40 by the driving roller pair 50a and the follower roller pair 55a and the disk cartridge 1 is held within the holder 40.

Thereafter, the disk gripper 11 is moved downward to the position of the drive unit 14a by the lifting means 70. Then, the drive motor 56a of the gripper roller rotating means 56 is rotated in the reverse direction and the disk cartridge 1 within the holder 40 is introduced into the drive unit 14a. Then, the driving roller pair 50a and the follower roller pair 55a are opened. Where the disk cartridge 1 is introduced into the drive unit 14a in this way, if it is desired to use the lower side of the optical disk contained in the horizontally transported disk cartridge 1, the CPU 81 brings the rotational control unit 84 into operation so that the drive motor 74a of the rotational driving means 74 is rotated and the disk cartridge 1 is rotated through 180 degrees.

When the disk cartridge 1 is introduced into the drive unit 14a, the optical disk control unit 82a comes into operation and the recording or reproduction of the optical disk within the disk cartridge 1 is performed. When the recording or reproduction is completed so that the disk cartridge i is delivered to the disk inlet/outlet port 15 of the drive unit 14a, the disk cartridge 1 is again held by the disk gripper 11, transported to the position in the disk storage device 13a where it was previously stored and stored thereat.

Where the disk cartridge 1 is transported in the above mentioned manner, if the selected disk cartridge is stored in the disk storage device 13b on the opposite side to the unit 14a, the driving cams 61a and 61b are rotated by the gripper roller changeover means 57a so that the driving roller pair 50b and the follower roller pair 55b on the side of the disk storage device 13b are closed so that the disk cartridge 1 is held and accommodated in the holder 40. Then, after the disk gripper 11 has been transported to the position of the drive unit 14a, the driving roller pair 50b and the follower roller pair 55b on the side of the disk storage device 13b are opened and time driving roller pair 50a and the follower roller pair 55a on the side of the disk storage device 13a are closed, thereby inserting the disk cartridge 1 within the holder 40 into the drive unit 14a.

Also, in order to return the disk cartridge 1 to the disk storage device 13b from the drive unit 14a, the operation which is entirely reverse to the above-mentioned operation is performed.

(2) In the case of exchanging the disk cartridges 1 between the disk storage devices and the outside:

When the exchange of the sixteen disk cartridges 1 stored for example the first block 32a of the disk storage device 13a is commanded through the input/output interface 90 of the controller 18, the CPU 81 confirms whether the disk cartridges 1 are being subjected to recording or reproducing operation in the drive units 14a and 14b or in transit so that when the absence of the recording, reproduction and transportation of the disk cartridges 1 is confirmed, the locking means control unit 87 is brought into operation to release the locking of the loading door 22 by the locking means 23 of the moving storage unit 16. When the loading door 22 is opened in response to the release of the locking, the door opening/closing detecting switch 24 comes into cooperation and a signal resulting from this operation causes the power supply control unit 88 to turn off the power supply of the apparatus, with the result that when the loading door 22 is open, the disk transport device 12, etc., are prevented from operating and the operator is prevented from receiving by any chance an electric shock or having his hand caught in the disk transport device 12 when the operator puts his hand into the apparatus.

When the loading door 22 is opened so that the door opening/closing detecting switch 24 comes into operation, if the power supply is not turned off by some reason or other, the power supply, monitoring means 89 comes into operation, so that an operation inhibit signal is sent to the CPU 81 at the expiration of a given time period, e.g., 10 seconds. When the preparation inhibit signal is received, the CPU 81 displays an error signal on the display control unit 19 and also the operation of the lifting control in unit 83, etc., is inhibited. In tills way, the safety is ensured doubly when the loading door 22 is opened.

In response to the opening of the loading door 22, the storage pack 21 mounted on the loading door 22 is drawn out with the access opening facing upward. When this occurs, the storage pack 21 is exchanged for another storage pack 21 storing new disk cartridges 1. At this time, the windows 28 for mad in the storage pack 21 are closed by the shielding plates 30 so that the stoppers 27 are not moved and thus the disk cartridges 1 are locked by the stoppers 27. As a result, with the disk cartridges 1 stored therein, the storage pack 21 can be removed and transferred.

Figure 4:
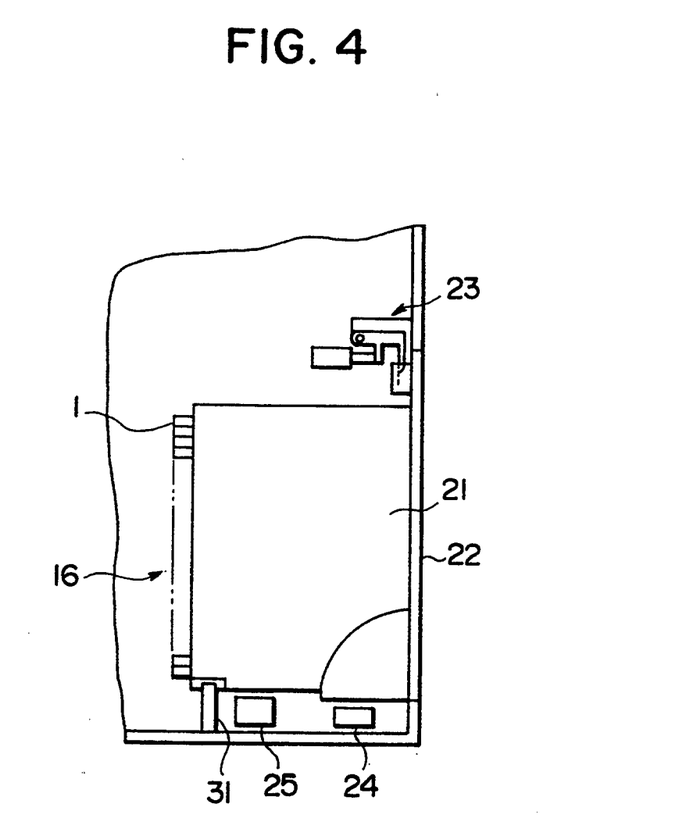
FIG. 4 is a view showing the arrangement of the moving storage unit.

After the new storage pack 21 has been mounted on the loading door 22, the loading door 22 is closed so that the locking means 23 comes into operation to lock the loading door 22 and also the door opening/closing detecting switch 24 comes into operation to turn on the power supply of the apparatus by the power supply control unit 88 in response to a signal resulting from its operation. When the loading door 22 is closed, the storage pack 21 is loaded at a given position. At this time, whether storage pack 21 has been loaded is detected by the pack detecting switch 25. Thus, when the storage pack 21 has not been loaded, in response to an absence-of-storage-pack signal from the pack detecting switch 25, the locking means controller 87 comes into operation so that the locking by the locking means 23 is released and the loading door 22 is partly opened, thereby displaying an error on the display control unit 19.

As a result, it is possible to prevent the disk cartridges 1 from falling off due to the fact that the disk transport device 12 comes into operation in the condition where the storage pack 21 is not loaded.

When the disk cartridges 1 are stored in the storage pack 21, the operation of exchanging the disk cartridges 1 between the storage pack 21 and the disk storage device 13a is started.

Firstly, when the loading door 22 is closed and the storage pack 21 is loaded at a given position, the operating claws 29 of the storage pack 21 are pushed upward by the locking release claws 31 provided on the apparatus proper and the shielding plates 30 are moved, thereby opening the windows 28 of the storage pack 21. This permits the stoppers 27 to move into the windows 28 and the locking of the disk cartridges 1 is released.

In this condition, if the administration number of the first block 32a is designated and a command is sent to it from the CPU 81 to exchange the sixteen disk cartridges 1 stored in the first block 32a of the disk storage device 13a for the disk cartridges 1 stored in the storage pack 21, the lifting control unit 83 comes into operation and the disk gripper 11 is moved to the position of the first slot of the storage pack 21 by the lifting means 70. Thus, the disk gripper 11 takes out and holds the unused disk cartridge 1 stored in the first slot of the storage pack 21. This disk gripper 11 is transported to the position of the temporary stand-by block 33 of the disk storage device 13a and the unused disk cartridge 1 contained in the disk gripper 11 is stored in the temporary stand-by block 33.

Then, the disk gripper 11 is moved to the position of the first block 32a of the disk storage device 13a. Thus, the used-up disk cartridge 1 stored in the first block 32a is drawn out and held by the disk gripper Then, the disk griper 11 is transported to the position of time first slot of the storage pack 21 which has previously been emptied and become vacant and the used-up disk cartridge 1 is stored in this slot.

Thereafter, the disk gripper 11 is transported to the position of the temporary stand-by block 33 so that the disk gripper 11 again holds the unused disk cartridge 1 which is waiting in the temporary stand-by block 33. The disk gripper 11 is then moved to the position of the first slot in the first block 32a of the disk storage device 13a and the unused disk cartridge 1 is stored in this slot.

The above mentioned operation is repeated until all of the disk cartridges 1 stored in the designated first block 32a of the disk storage device 13a are changed.

In this way, the used-up disk cartridges 1 can be automatically exchanged for the unused disk cartridge 1. Also, it is possible to effect the exchange of the used-up disk cartridges 1 for the unused disk cartridges 1 one at a time by utilizing the disk exchange window 17 formed in the apparatus proper.

It is to be noted that while the foregoing exchange operation has been explained with reference to the case where the disk cartridge 1 stored in the disk storage device 13a is first caused to wait in the temporary stand-by block 33 and then the disk cartridge 1 in the storage pack 21 is transported, it is possible to first cause the disk cartridge in the storage pack 21 stand by temporarily and then transport the disk cartridge 1 stored in the disk storage device 13a.

Since the disk cartridges 1 in the disk storage devices 13a and 13b can be exchanged block by block in this way, not only the control of the disk cartridges 1 during the exchange can be effected easily but also the processing time of the CPU 8 can be reduced.

Also, during the time that the exchange of the disk cartridges 1 is taking place between the disk storage device 13a and the storage pack 21, if recording and reproduction commands are respectively sent to the optical disk controllers 82a and 82b, the CPU 81 interrupts the exchange operation for a time and takes out and transports the required disk cartridge 1 to the drive units 14a and 14b by the disk gripper 11, thereby affecting the recording and reproduction. When the recording and reproduction are completed, time CPU 81 resumes the exchange operation.

Figure 13:
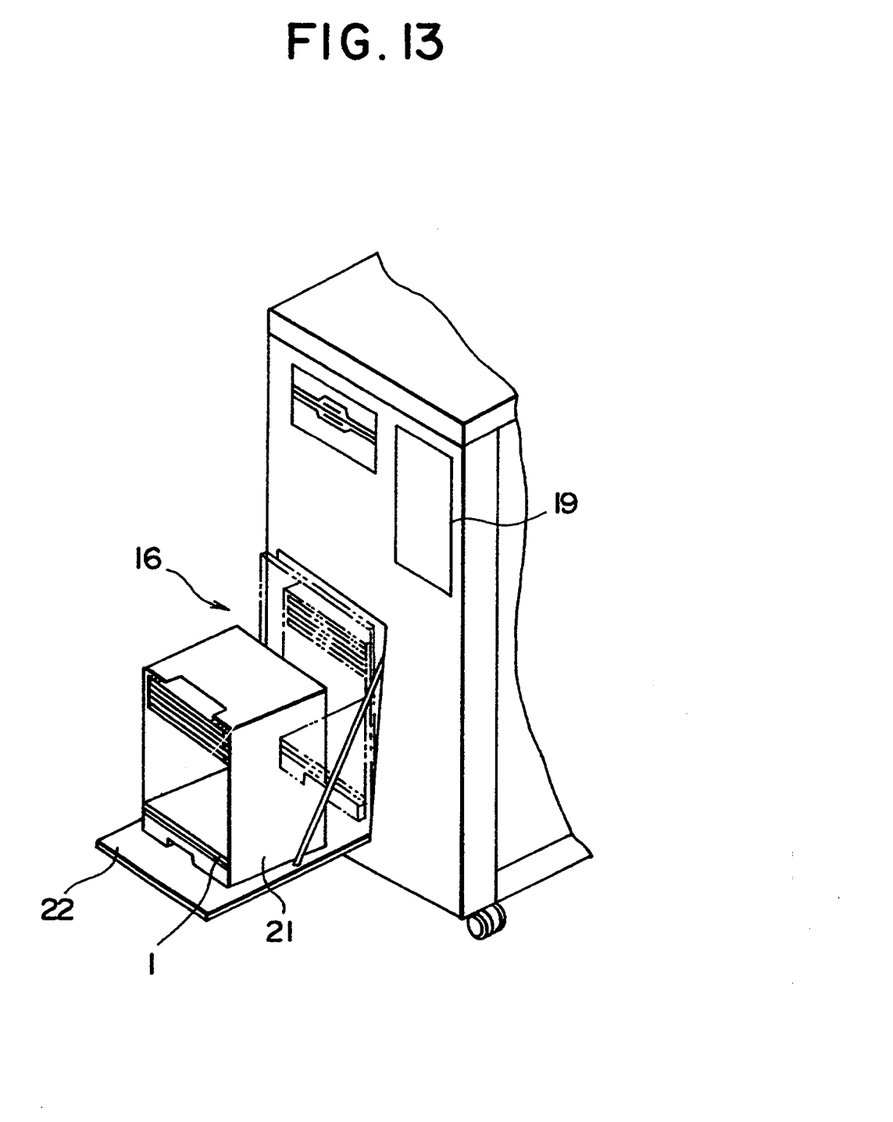
FIG. 13 is a perspective view showing the moving storage unit of another embodiment.

It is to be noted that while the above embodiment has been described with reference to the case where the storage pack 21 is mounted on the loading door 22 so that the storage pack 21 is unloaded and loaded by the opening and closing of the loading door 22, the storage pack 21 may be loaded and unloaded as a single unit as shown in FIG. 13. In this case, the loading door 22 is also opened by its downward rotation so that when the storage pack 21 is to be loaded or unloaded, the storage pack 21 can be placed on the loading door 22 and therefore the loading and unloading of the storage pack 21 can be effected easily.

We claim:

1. An automatic disk exchange apparatus comprising:
a disk gripper including a holder for horizontally holding a disk cartridge, a pair of rotational drums each attached to an opposite end of said holder and having a gear formed in an outer peripheral surface thereof and a disk access opening in a central portion thereof, and disk exchange means for selectively introducing onto and removing a disk cartridge in a horizontal position from said holder through either of said disk access openings;
a disk transport device including lifting means for vertically moving said disk gripper to stop at a given position, and rotating means engaged with said gear formed in the outer peripheral surface of one of said rotational drums for rotating said disk gripper about a center of said disk access opening serving as an axis of rotation;
a pair of disk storage devices each arranged on opposite sides of a transport path of said disk gripper and adapted for horizontally storing a plurality of disk cartridges; and
a plurality of drive units arranged at least in a lower part of one of said disk storage devices for recording and reproducing information from disks.

2. The automatic disk exchange apparatus according to claim 1, wherein said disk exchange means of said disk gripper comprises:
two driving roller pairs respectively arranged at opposite ends of one longitudinal side of said holder and including a first inner gripper roller and a second inner gripper roller for gripping a disk cartridge within said holder and a first and second outer gripper roller each arranged externally contiguous to one of said inner gripper rollers to grip one of said disk cartridges within one of said disk storage devices;
two follower roller pairs respectively arranged at ends of the other longitudinal side of said holder and including first and second inner gripper rollers and first and second outer gripper rollers which are respectively arranged in positions opposite said driving roller pairs;
gripper roller rotational driving means for rotating said driving gripper rollers;
driving roller pair changeover means including a pair of driving cams respectively engaged with said driving roller pairs at said holder ends and connected to each other with a phase shift of 180 degrees therebetween; and
follower roller pair changeover means including a pair of cams each mounted on a rotary shaft of one of said driving cams with a phase shift of 180 degrees therebetween, and a pair of links each connected between one of said pair of cams and one of said follower roller pairs.

3. The automatic disk exchange apparatus as set forth in claim 2, wherein said driving roller pair changeover means comprises:
a pair of main arms arranged along said one longitudinal side of said holder and having a common rotary shaft provided at the base ends thereof,
a pair of auxiliary arms each connected to a forward end of each one of said main arms,
said two driving roller pairs each mounted on the ends of each one of said auxiliary arms;
said driving cams respectively engaged with said driving roller pairs with a phase shift of 180 degrees therebetween; and
rotational driving means for rotating said driving cams.

* * * * *